United States Patent
Boday et al.

(10) Patent No.: US 9,527,939 B2
(45) Date of Patent: *Dec. 27, 2016

(54) LACTIDE-BASED ACRYLATE POLYMERS

(71) Applicant: International Business Machines Corporation, Armonk, NY (US)

(72) Inventors: Dylan J. Boday, Tucson, AZ (US); Timothy C. Mauldin, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,789

(22) Filed: Apr. 7, 2015

(65) Prior Publication Data

US 2016/0215079 A1    Jul. 28, 2016

Related U.S. Application Data

(63) Continuation of application No. 14/606,459, filed on Jan. 27, 2015, now Pat. No. 9,260,550.

(51) Int. Cl.
| | |
|---|---|
| C08F 24/00 | (2006.01) |
| C08F 20/06 | (2006.01) |
| C08F 118/02 | (2006.01) |
| C08F 124/00 | (2006.01) |
| C08F 8/50 | (2006.01) |

(52) U.S. Cl.
CPC .............. *C08F 24/00* (2013.01); *C08F 8/50* (2013.01); *C08F 124/00* (2013.01)

(58) Field of Classification Search
CPC ................................ C08F 124/00; C08F 8/50
USPC ....................... 526/266, 317.1, 319
See application file for complete search history.

(56) References Cited

U.S. PATENT DOCUMENTS

| | | | |
|---|---|---|---|
| 5,852,117 A * | 12/1998 | Schoenberg | C08G 63/00 525/186 |
| 7,589,151 B2 | 9/2009 | Aoki et al. | |
| 8,203,007 B2 | 6/2012 | Jing et al. | |
| 8,378,027 B2 | 2/2013 | Hong et al. | |
| 8,741,877 B2 | 6/2014 | Moller et al. | |
| 8,748,526 B2 | 6/2014 | Taniguchi | |
| 8,791,228 B2 | 7/2014 | Sirol | |
| 8,835,558 B2 | 9/2014 | Lee et al. | |
| 2007/0032577 A1 | 2/2007 | Kanzawa et al. | |
| 2012/0078004 A1 | 3/2012 | Fruchey et al. | |
| 2014/0163144 A1 | 6/2014 | Cernohous et al. | |

FOREIGN PATENT DOCUMENTS

WO    2014009113    1/2014

OTHER PUBLICATIONS

List of IBM Patents or Patent Applications Treated as Related.

* cited by examiner

*Primary Examiner* — William Cheung

(57) ABSTRACT

In an example, a polyacrylate is disclosed. The polyacrylate includes a ring-closed portion and a ring-opened portion. The ring-closed portion includes a set of pendant lactide groups. The ring-opened portion includes a set of pendant (O—X) groups, where X is hydrogen (H) or a non-lactide group.

20 Claims, 3 Drawing Sheets

LACTIDE-BASED ACRYLATE POLYMERS

I. CROSS REFERENCE TO RELATED APPLICATIONS

Figure 1:
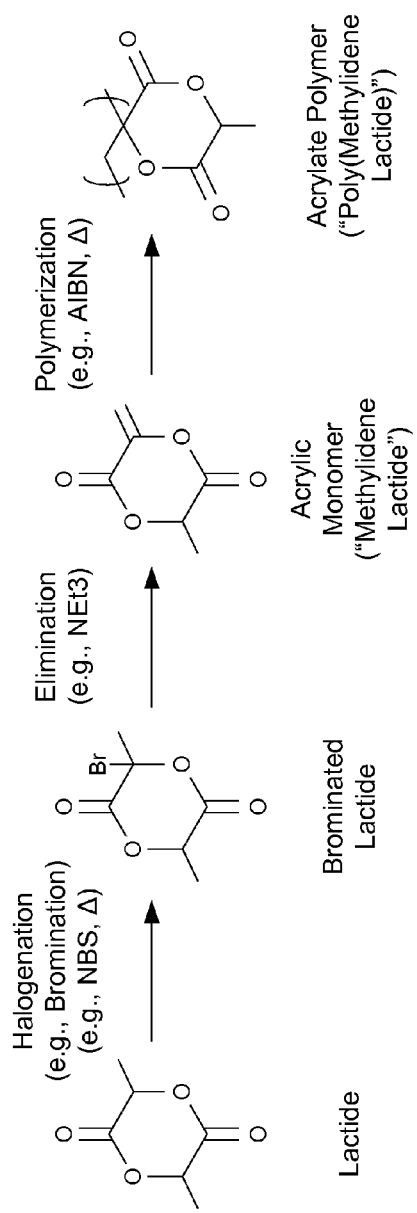

This application is a continuation application and claims priority from U.S. patent application Ser. No. 14/606,459, entitled "LACTIDE-BASED ACRYLATE POLYMERS," filed on Jan. 27, 2015, now issued as U.S. Pat. No. 9,260,550, which is incorporated herein in its entirety.

II. FIELD OF THE DISCLOSURE

The present disclosure relates generally to synthesis of polymers from biobased feedstocks.

III. BACKGROUND

A class of plastics broadly known as acrylics, or polyacrylates, is commonly used in the coatings, paints and adhesives markets, and finds widespread use as structural polymers, textiles, emulsifiers, and packaging materials. Plastics are typically derived from a finite and dwindling supply of petrochemicals, resulting in price fluctuations and supply chain instability. Hence, there is a need for renewable and sustainable feedstocks for synthesis of polyacrylates.

IV. SUMMARY OF THE DISCLOSURE

According to an embodiment, a process for the production of an acrylate polymer is disclosed. The process includes reacting lactide with a bromination material to form a brominated lactide. The process further includes reacting the brominated lactide with an elimination material to form an acrylic monomer, and polymerizing the acrylic monomer to form an acrylate polymer.

According to another embodiment, a polyacrylate is disclosed that includes a ring-closed portion and a ring-opened portion. The polyacrylate polymer is formed by a process that includes polymerizing a lactide-based acrylic monomer to form an acrylate polymer, and reacting the acrylate polymer with a ring-opening material to form the ring-opened portion. The ring-opened portion includes a first set of pendant groups.

According to another embodiment, a polyacrylate is disclosed that includes a ring-closed portion and a ring-opened portion. The ring-closed portion includes a set of pendant lactide groups, and the ring-opened portion includes a set of pendant O—X groups, where X is hydrogen (i.e., pendant O—H groups) or a non-lactide group.

One advantage of the present disclosure is the use of renewable and sustainable feedstocks, such as the commodity chemical lactide, for synthesis of polyacrylates rather than the use of non-renewable petroleum-based feedstocks. Another advantage associated with the present disclosure is the ability to "chemically functionalize" the lactide-based polyacrylate via a ring-opening reaction to form acrylate polymers having a ring-closed portion (having pendant lactide groups) and a ring-opened portion (having pendant functional groups, also referred to as "synthetic handles"). A further advantage associated with the present disclosure is that the "synthetic handles" that result from the ring-opening reaction may be "functionalized" to form acrylate polymers with more complex architectures.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. BRIEF DESCRIPTION OF THE DRAWINGS

Figure 2:
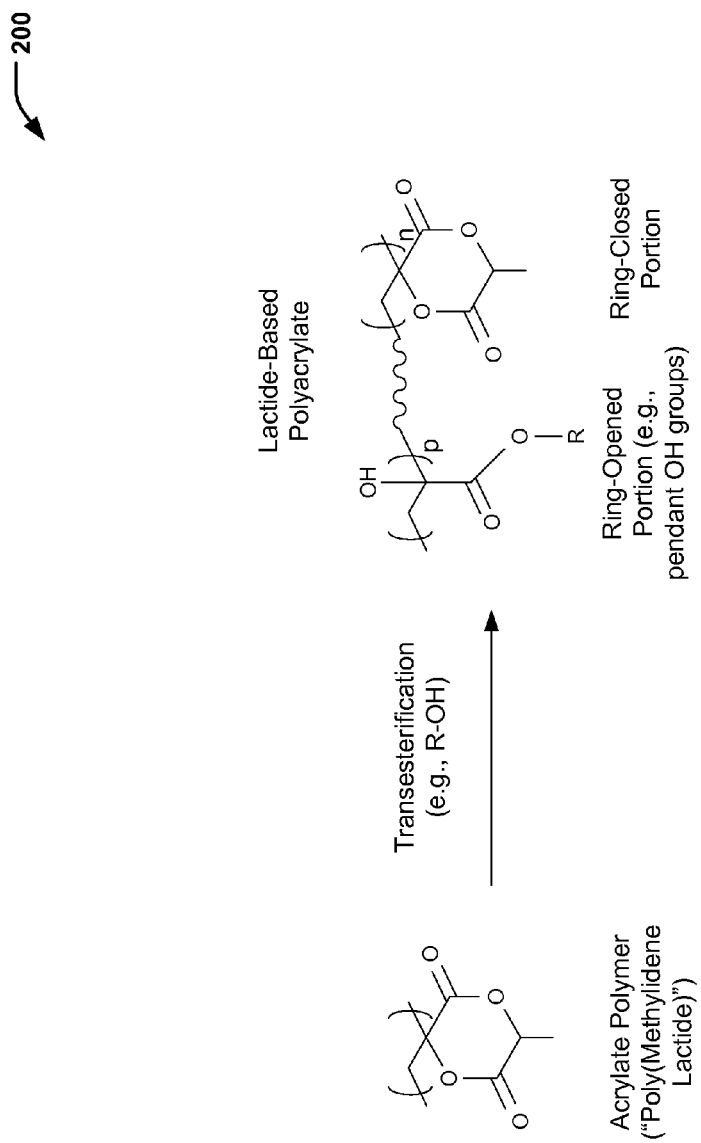
Figure 3:
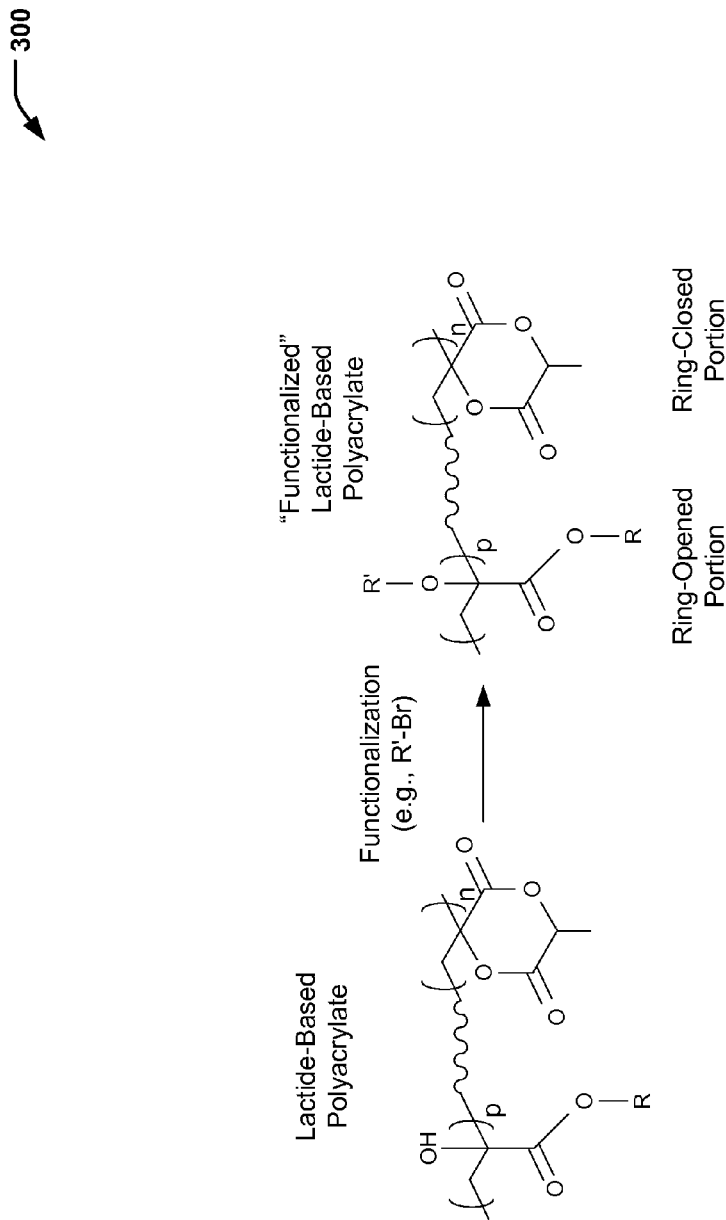

FIG. 1 is a chemical reaction diagram showing the preparation of an acrylate polymer from the cyclic ester lactide, according to one embodiment;

FIG. 2 is a chemical reaction diagram showing a ring-opening reaction of the acrylate polymer of FIG. 1 to form an acrylate polymer with the cyclic diester ring either intact (a "ring-closed portion") or opened (a "ring-opened portion"), according to one embodiment; and FIG. 3 is a chemical reaction diagram showing functionalization of the acrylate polymer of FIG. 2 by replacing pendant functional groups in the ring-opened portion of the acrylate polymer with another material, according to one embodiment.

VI. DETAILED DESCRIPTION

The present disclosure relates to synthesis of a new class of acrylic polymers derived from the chemical lactide, which is a commodity chemical, for example derived from sugar. A high-yielding, two-step synthetic route from lactide forms an acrylic monomer, which is polymerized using a radical polymerization technique to form an acrylic polymer (also referred to herein as a polyacrylate). The lactide-based polyacrylate provides additional flexibility via conversion into a wide array of different acrylic derivatives with useful and tunable material properties under mild synthetic conditions. Thus, the polyacrylates of the present disclosure represent bio-based acrylates that can be synthesized from renewable resources using commodity chemicals, rather than non-renewable petroleum resources. Ring opening techniques described herein enable formation of irregular polymers. An irregular polymer refers to a macromolecule that, while based on a single monomer, is not formed exclusively of a single repeating structural unit. Thus, some irregular polymers are also referred to as "pseudo copolymers." As used herein, the term "polymer" includes polymers formed of a single repeating structural unit, irregular polymers, pseudo copolymers, and copolymers.

FIG. 1 illustrates a chemical reaction diagram 100 showing the preparation of an acrylate polymer from the cyclic diester lactide, according to one embodiment. FIG. 1 illustrates a synthetic approach to produce a lactide-based acrylic monomer, which may be polymerized to form a lactide-based polyacrylate. The lactide-based polyacrylate of FIG. 1 may be useful as a "stand-alone" polymer. Alternatively, as described further herein with respect to FIG. 2, a ring-opening reaction of the cyclic diester ring of the "stand-alone" polymer of FIG. 1 may yield multiple different acrylate variations. As another example, as described further herein with respect to FIG. 3, a ring-opening reaction of the cyclic diester ring of the "stand-alone" polymer of FIG. 1 may form pendant functional groups, which may serve as "synthetic handles" for functionalization towards more complex architectures.

In the particular embodiment illustrated in FIG. 1, a lactide may be used as a starting material to prepare an acrylic monomer (referred to herein as "methylidene lactide"), which may then be polymerized to form a polyacrylate (referred to herein as "poly(methylidene lactide)"). The lactide may have any stereo-isomeric configuration (e.g., L-, D-, Meso-) or combinations of stereo-isomeric configurations. FIG. 1 illustrates that halogenation/dehydrohalogenation (e.g., a bromine addition and elimination reaction) may be performed on the lactide. In the example of FIG. 1, the lactide is reacted with a bromination material (e.g., N-bromosuccinimide (NBS)) to form a brominated lactide. As an illustrative, non-limiting example of a process of forming the brominated lactide, lactide in benzene (e.g., 15 weight/volume percent) and NBS (e.g., 1.05 equivalents) may be stirred at 80° C., and benzoyl peroxide (e.g., 0.02 equivalents in a 5 weight/volume percent benzene solution) may be added dropwise and stirred (e.g., for 24 hours).

The brominated lactide is reacted with an elimination material (e.g., triethylamine (NEt3)) to form the acrylic monomer. In alternative embodiments, the bromination material and/or the elimination material may be different. For example, the bromination material may include bromine ($Br_2$) and/or the elimination material may include a different amine or an alkoxide, among other alternatives. As an illustrative, non-limiting example of a process of forming the acrylic monomer, NEt3 (1.05 equivalents in a 50 weight/volume percent solution of tetrahydrofuran (THF)) may be slowly added dropwise (e.g., 0.5 mL/min) to a solution of the brominated lactide in THF (e.g., 20 weight/volume percent). After addition, the solution may be stirred (e.g., for one hour).

FIG. 1 illustrates that the acrylic monomer ("methylidene lactide") may be polymerized to form the polyacrylate ("poly(methylidene lactide)"). FIG. 1 illustrates a particular embodiment in which an azobisisobutyronitrile (AIBN) thermal polymerization method is employed. However, it will be appreciated that alternative polymerization techniques may be employed. For example, a different thermal initiator or an ultraviolet (UV) initiator may be used, among other alternatives. Testing on the resulting acrylate polymer indicated an average molecular weight ($M_n$) of about 20.5 kg/mol, a dispersity (Đ) of about 1.82, a glass transition temperature ($T_g$) of about 231° C., and a degradation temperature ($T_d$) of about 300° C. Size-exclusion chromatography (SEC) was done on a Waters® ACQUITY® Advanced Polymer Chromatography™ (APC) system with three 4.6 mm×150 mm APC XT columns (450 Å, 2.5 μm; 125 Å, 2.5 μm; and 45 Å, 1.7 μm) connected in series and a refractive index detector calibrated with polystyrene standards. THF eluent was used at 40° C. with a flow rate of one mL/minute. Differential Scanning calorimetry (DSC) was done with a TA Instruments® Q100 DSC via heat-cool-heat cycles at a heating rate of 15 K/min and a cooling rate of 10 K/min. Data from the second heating cycle is reported. Thermal gravimetric analysis (TGA) was done on a TA Instruments® Q50 TGA, and tests were performed under nitrogen gas at a heating rate of 20 K/minute.

Thus, FIG. 1 illustrates an embodiment of a process for the production of a polyacrylate from renewable resources. The lactide-based polyacrylate of FIG. 1 may be useful as a "stand-alone" polymer (e.g., without further modification or reaction). Alternatively, as described further herein with respect to FIG. 2, a ring-opening reaction of the cyclic diester ring of the "stand-alone" polymer of FIG. 1 (e.g., using an alcohol, R—OH) may yield multiple different acrylate variations. Further, as described further herein with respect to FIG. 3, a ring-opening reaction may form pendant functional groups (e.g., pendant hydroxyl groups in the case of a ring-opening reaction using an alcohol), which may serve as "synthetic handles" for functionalization towards more complex architectures.

FIG. 2 is a chemical reaction diagram 200 showing a ring-opening reaction (transesterification) of the lactide-based polyacrylate of FIG. 1 to form an acrylate polymer with a "ring-closed portion" (i.e., with the cyclic diester ring intact) and a "ring-opened portion," according to one embodiment. FIG. 2 illustrates that a ring-opening reaction (e.g., using an alcohol, R—OH) may be performed on the cyclic diester ring of the "stand-alone" polymer of FIG. 1 to yield a different acrylate variation (with tailored properties). For example, using a moderate-to-long chain alcohol (e.g., butanol, 2-ethylhexanol, etc.) in the ring-opening reaction may yield an elastomeric-type acrylate that is more flexible than the "stand-alone" polymer of FIG. 1. As another example, using a smaller and/or more rigid alcohol (e.g., methanol, benzyl alcohol, etc.) in the ring-opening reaction may yield an acrylate that is more rigid than the "stand-alone" polymer of FIG. 1.

In the particular embodiment illustrated in FIG. 2, the polyacrylate ("poly(methylidene lactide)") of FIG. 1 is reacted with a ring-opening material (e.g., an alcohol, R—OH) in the presence of a catalyst (e.g., triazabicyclodecene (TBD)) to form a polyacrylate having a ring-opened portion (with pendant hydroxyl groups) and a ring-closed portion (with the lactide ring intact). The ring-opening reaction exists in an equilibrium with the initial acrylate. The distribution of reactants and products can be adjusted or controlled based on reaction conditions (e.g., based on Le Chatelier principles). The polyacrylate formed by the ring-opening reaction may represent a polymer in which at least a portion of the lactide rings remain in a ring-closed state. In a particular embodiment, the mole percentage of the ring-opened portion of the acrylate polymer is not be greater than about 95 mole percent of the acrylate polymer. FIG. 2 illustrates the ring-closed portion is represented as n (an integer), the ring-opened portion is represented as p (an integer), and a ring-opened molar percentage or a ring-closed molar percentage for a particular polymer may be determined based on the integers.

As described further with respect to the examples herein, adjusting a temperature of the ring-opening reaction may result in a change in a molar percentage of the ring-opened state relative to a molar percentage of the ring-closed state. In some cases, an increased temperature of the ring-opening reaction may result in an equilibrium shift toward a greater molar percentage of the ring-opened state (e.g., more of the lactide rings may be opened). Further, the molar percentage of the ring-opened portion may vary based on the particular ring-opening material (e.g., alcohol) that is used in the ring-opening reaction. As described further with respect to the examples herein, for a ring-opening reaction at a particular temperature, a molar percentage of the polymer in the ring-opened state may vary based on the particular alcohol that is selected as the ring-opening material. As an illustrative, non-limiting example, when the alcohol is methanol, a molar percentage of the polymer in the ring-opened state may be in a range between about 15 molar percent and about 81 molar percent (depending on reaction temperature). As another illustrative example, when the alcohol is n-butanol, a molar percentage of the polymer in the ring-opened state may be in a range between about 15 molar percent and about 75 molar percent (depending on reaction temperature). As a further example, when the alcohol is benzyl alcohol, a molar percentage of the polymer in the ring-opened state may be in a range between about 0 molar percent and about 17 molar percent (depending on reaction temperature).

The following are specific, non-limiting examples of reaction conditions and resulting products based on testing:

Example 1

Preparation of an Acrylate Polymer Using Methanol

An acrylate polymer having a ring-opened portion and a ring-closed portion was prepared by reacting the polyacrylate ("poly(methylidene lactide)") of FIG. 1 with methanol in the presence of triazabicyclodecene (TBD) at about 0.1 mole percent. At a reaction temperature of about −25° C., the resulting acrylate polymer had a ring-opened mole percentage of about 15.0%, an average molecular weight ($M_n$) of about 23.6 kg/mol, and a dispersity ($Đ$) of about 2.00.

Example 2

Preparation of an Acrylate Polymer Using Methanol

An acrylate polymer having a ring-opened portion and a ring-closed portion was prepared by reacting the polyacrylate ("poly(methylidene lactide)") of FIG. 1 with methanol in the presence of triazabicyclodecene (TBD) at about 0.1 mole percent. At a reaction temperature of about 5° C., the acrylate polymer had a ring-opened mole percentage of about 34.5%, an average molecular weight (MO of about 14.6 kg/mol, and a dispersity ($Đ$) of about 1.69.

Example 3

Preparation of an Acrylate Polymer Using Methanol

An acrylate polymer having a ring-opened portion and a ring-closed portion was prepared by reacting the polyacrylate ("poly(methylidene lactide)") of FIG. 1 with methanol in the presence of triazabicyclodecene (TBD) at about 0.1 mole percent. At a reaction temperature of about 23° C., the acrylate polymer had a ring-opened mole percentage of about 67.3%, an average molecular weight (MO of about 11.5 kg/mol, and a dispersity ($Đ$) of about 1.43.

Example 4

Preparation of an Acrylate Polymer Using Methanol

An acrylate polymer having a ring-opened portion and a ring-closed portion was prepared by reacting the polyacrylate ("poly(methylidene lactide)") of FIG. 1 with methanol in the presence of triazabicyclodecene (TBD) at about 0.1 mole percent. At a reaction temperature of about 60° C., the acrylate polymer had a ring-opened mole percentage of about 81 percent.

Example 5

Preparation of an Acrylate Polymer Using n-butanol

An acrylate polymer having a ring-opened portion and a ring-closed portion was prepared by reacting the polyacrylate ("poly(methylidene lactide)") of FIG. 1 with n-butanol in the presence of triazabicyclodecene (TBD) at about 0.1 mole percent. At a reaction temperature of about 60° C., the acrylate polymer had a ring-opened mole percentage of about 62.3%, an average molecular weight ($M_n$) of about 15.3 kg/mol, and a dispersity ($Đ$) of about 1.74.

Example 6

Preparation of an Acrylate Polymer Using Benzyl Alcohol

An acrylate polymer having a ring-opened portion and a ring-closed portion was prepared by reacting the polyacrylate ("poly(methylidene lactide)") of FIG. 1 with benzyl alcohol in the presence of triazabicyclodecene (TBD) at about 0.1 mole percent. At a reaction temperature of about 60° C., the acrylate polymer had a ring-opened mole percentage of about 16.6%, an average molecular weight ($M_n$) of about 18.7 kg/mol, and a dispersity ($Đ$) of about 1.70.

Thus, FIG. 2 illustrates a ring-opening reaction (transesterification) of the lactide-based polyacrylate ("poly(methylidene lactide)") of FIG. 1 to form an acrylate polymer with a "ring-opened portion" and a "ring-closed portion" (i.e., with the cyclic diester ring intact). While FIG. 2 illustrates a particular embodiment of a ring-opening reaction using an alcohol, it will be appreciated that alternative ring-opening material(s) may be used. For example, the ring-opening reaction may be performed using an amine (resulting in pendant N—H groups), ammonia, or water, among other alternatives Further, while particular examples of alcohols are described, it will be appreciated that alternative alcohols may be used in the ring-opening reaction. Illustrative, non-limiting examples of alcohols include methanol, ethanol, propanol, n-butanol, t-butanol, s-butanol, 2-ethylhexanol, benzyl alcohol, cyclohexanol, glycidol, dodecanol, 2-ethoxyethanol, hexanol, hexadecanol, octadecanol, phenol, or 2,2,2-trifluoroethanol, among other alternatives.

FIG. 3 is a chemical reaction diagram 300 showing functionalization of the acrylate polymer of FIG. 2 by replacing pendant functional groups (e.g., pendant O—H groups) in the ring-opened portion of the acrylate polymer with another material (e.g., pendant O—R' groups), according to one embodiment. The ring-opening reaction illustrated in FIG. 2 forms pendant hydroxyl (OH) groups, which may be referred to as "synthetic handles." FIG. 3 illustrates that the pendant hydroxyl groups can be modified to further engineer properties of the acrylate polymer. As illustrative, non-limiting examples, the acrylate polymer may be functionalized with a variety of alkyl halides (to form ethers), isocyanates (to form carbamates), or carboxylic acid/acid halides/esters (to form esters), among other alternatives. Different pendant groups may impart various properties (e.g., flexibility or rigidity) to the functionalized acrylate polymer.

In the particular embodiment illustrated in FIG. 3, the acrylate polymer of FIG. 2 is reacted with a functionalization material (e.g., an alkyl-bromide). The functionalization material reacts with hydroxyl groups in the ring-opened portion to add different types of chemical moieties into the polyacrylate to further "tune" the properties of the acrylate polymer (e.g., physical properties, chemical properties, mechanical properties) for use in various applications. FIG. 3 illustrates that the hydroxyl groups (O—H) in the ring-opened portion of the acrylate polymer of FIG. 2 are replaced by pendant O—R' groups, where R' may include a hydrocarbon, an organic chain with heteroatoms, or inorganic compound, among other alternatives. As in FIG. 2, the ring-closed portion of the "functionalized" acrylate polymer of FIG. 3 is represented by the integer n, the ring-opened portion is represented by the integer p, and a ring-opened molar percentage (with the pendant O—H groups replaced with pendant O—R' groups) or a ring-closed molar percentage for a particular acrylate polymer may be determined based on the integers.

Thus, FIG. 3 illustrates that the pendant functional groups (e.g., hydroxyl groups) formed by a ring-opening reaction of the lactide-based polyacrylate of FIG. 1 ("poly(methylidene lactide)") may be functionalized towards more complex architectures (to further engineer properties of the acrylate polymer).

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A polyacrylate having a lactide-based polyacrylate backbone, the polyacrylate comprising:
    a ring-closed portion that includes a set of pendant lactide groups in the lactide-based polyacrylate backbone; and
    a ring-opened portion that includes a set of pendant (O—X) groups, wherein X is hydrogen (H) or a non-lactide group.

2. The polyacrylate of claim 1, wherein the ring-opened portion includes pendant hydroxyl (O—H) groups, and wherein the ring-opened portion further includes a set of functional (O—R) groups associated with an alcohol (R—OH) that is used as a ring-opening material to form the ring-opened portion.

3. The polyacrylate of claim 2, wherein the ring-opened portion includes a set of functional (O—R) groups associated with an alcohol (R—OH) that is used as a ring-opening material to form the ring-opened portion, and wherein the ring-opened portion further includes a set of functionalized (O—R') groups.

4. The polyacrylate of claim 3, wherein R' is a hydrocarbon, an organic chain with heteroatoms, an inorganic compound, or a combination thereof.

5. The polyacrylate of claim 1, wherein the ring-opened portion is not greater than about 95 mole percent of the polyacrylate.

6. A polyacrylate having a lactide-based polyacrylate backbone and having a ring-closed portion in the lactide-based polyacrylate backbone and a ring-opened portion in the lactide-based polyacrylate backbone, the polyacrylate formed by a process that includes:
    polymerizing a lactide-based acrylic monomer to form an acrylate polymer; and
    reacting the acrylate polymer with a ring-opening material to form the ring-opened portion, wherein the ring-opened portion includes a first set of pendant groups.

7. The polyacrylate of claim 6, wherein:
    the ring-opening material includes an alcohol (R—OH); and
    the first set of pendant groups includes pendant hydroxyl (O—H) groups.

8. The polyacrylate of claim 7, wherein the process further includes replacing the pendant hydroxyl (O—H) groups in the ring-opened portion with different pendant (O—R') groups using a functionalization material.

9. The polyacrylate of claim 6, wherein the process further includes:
    reacting a lactide with a halogenation material to form a halogenated lactide; and
    reacting the halogenated lactide with an elimination material to form the lactide-based acrylic monomer.

10. The polyacrylate of claim 9, wherein the halogenation material includes a bromination material.

11. The polyacrylate of claim 10, wherein the bromination material includes N-bromosuccinimide.

12. The polyacrylate of claim 9, wherein the elimination material includes triethylamine.

13. The polyacrylate of claim 9, wherein the lactide-based acrylic monomer is polymerized using an azobisisobutyronitrile (AIBN) thermal polymerization method.

14. A polyacrylate having a lactide-based polyacrylate backbone and having a ring-closed portion in the lactide-based polyacrylate backbone and a ring-opened portion in the lactide-based polyacrylate backbone, the polyacrylate formed by a process that includes:
    reacting a lactide-based acrylate polymer with a ring-opening material to form a polyacrylate having a ring-opened portion in the lactide-based polyacrylate backbone and a ring-closed portion in the lactide-based polyacrylate backbone, wherein the ring-opened portion is not greater than about 95 mole percent of the polyacrylate.

15. The polyacrylate of claim 14, wherein the ring-opening material includes an alcohol, an amine, or water.

16. The polyacrylate of claim 14, wherein the ring-opened portion includes pendant hydroxyl (O—H) groups.

17. The polyacrylate of claim 14, wherein the ring-opened portion includes a set of functional (O—R) groups associated with an alcohol (R—OH) that is used as the ring-opening material.

18. The polyacrylate of claim 14, wherein the lactide-based acrylate polymer is formed by a process that includes:
    reacting a lactide with a halogenation material to form a halogenated lactide;
    reacting the halogenated lactide with an elimination material to form an acrylic monomer; and
    polymerizing the acrylic monomer to form the lactide-based acrylate polymer.

19. The polyacrylate of claim 18, wherein the halogenation material includes N-bromosuccinimide, and wherein the elimination material includes triethylamine.

20. The polyacrylate of claim 19, wherein the lactide-based acrylate polymer has a number average molecular weight ($M_n$) of about 20.5 kg/mol, a dispersity ($Đ$) of about 1.82, a glass transition temperature ($T_g$) of about 231° C., and a degradation temperature ($T_d$) of about 300° C.

* * * * *